(12) United States Patent
Attar (10) Patent No.: US 11,741,270 B2
(45) Date of Patent: Aug. 29, 2023

(54) COMPUTER AIDED DESIGN (CAD)-BASED FOAM PART GENERATION FOR SEAT DESIGNS

(71) Applicant: Siemens Industry Software Inc., Plano, TX (US)

(72) Inventor: Marc Attar, Somerville, MA (US)

(73) Assignee: Siemens Industry Software Inc., Plano, TX (US)

( * ) Notice: Subject to any disclaimer, the term of this patent is extended or adjusted under 35 U.S.C. 154(b) by 1064 days.

(21) Appl. No.: 16/398,924

(22) Filed: Apr. 30, 2019

(65) Prior Publication Data

US 2020/0349232 A1 Nov. 5, 2020

(51) Int. Cl.
*G06F 30/00* (2020.01)
*G06F 30/17* (2020.01)
*A47C 7/18* (2006.01)
*B68G 7/00* (2006.01)
*A47C 31/02* (2006.01)

(52) U.S. Cl.
CPC .............. *G06F 30/00* (2020.01); *B68G 7/00* (2013.01); *G06F 30/17* (2020.01); *A47C 7/18* (2013.01); *A47C 31/02* (2013.01)

(58) Field of Classification Search
CPC ........... G06F 30/00; G06F 30/17; B68G 7/00; A47C 7/18; A47C 31/02
See application file for complete search history.

(56) References Cited

U.S. PATENT DOCUMENTS

| 6,144,890 | A | * | 11/2000 | Rothkop | G06F 30/15 700/182 |
| 2008/0015822 | A1 | * | 1/2008 | Ziolek | G06F 30/15 703/1 |
| 2009/0237410 | A1 | | 9/2009 | Baardse et al. | |
| 2014/0292058 | A1 | * | 10/2014 | Brauer | G06F 30/15 702/167 |
| 2014/0368020 | A1 | | 12/2014 | San Miguel et al. | |
| 2015/0006116 | A1 | | 1/2015 | Handigol et al. | |
| 2016/0004790 | A1 | * | 1/2016 | Kang | G06F 30/00 703/1 |

(Continued)

FOREIGN PATENT DOCUMENTS

| EP | 2969645 A1 | | 1/2016 |
| EP | 3945381 A1 | * | 2/2022 |

(Continued)

OTHER PUBLICATIONS

Susan Nace et al.; "Manufacturing custom-contoured wheelchair seating: A state-of-the-art review"; Prosthetics and Orthotics International 2019, vol. 43(4) 382-395 (Year: 2019).*

(Continued)

*Primary Examiner* — Rehana Perveen
*Assistant Examiner* — Nupur Debnath (57) ABSTRACT

A system may include an access engine and a foam part generation engine. The access engine may be configured to access a computer-aided design (CAD) seat surface that represents a seat surface of a seat design and access seat parameters for the seat design. The foam part generation engine may be configured to construct a CAD foam part for the seat design based on the CAD seat surface and the seat parameters.

17 Claims, 8 Drawing Sheets

(56) References Cited

U.S. PATENT DOCUMENTS

2016/0058584 A1* 3/2016 Cespedes ................. A61F 2/78
                                                                  700/98
2018/0096082 A1* 4/2018 Kang ..................... G06F 30/00

FOREIGN PATENT DOCUMENTS

JP            4105916 B2 *  6/2008
WO     WO-2012170543 A1 * 12/2012  ............. A47C 23/28

OTHER PUBLICATIONS

David M. Brienza et al.; "A manufacturing system for contoured foam cushions"; Journal of Rehabilitation Research and Development vol. 29 No. 4, 1992 pp. 32-40 (Year: 1992).*

Gurunath Vemulamulakonda et al.; "Approaches to Modeling the Dynamic Interaction f Automotive Seat and Occupant"; SAE Transactions , 2007, vol. 116, Section 6: Journal of Passenger Cars: Mechanical Systems Journal (2007), pp. 1038-1050 (Year: 2007).*

S Singare; "Manufacture of Custom Contoured Seat Cushions Using Computer-Aided Design"; Volume and Issue # 201-203 pp. 342-346 (Year: 2011).*

Mario Bosch et al: "An Intuitive Framework for Real-Time Freeform Modeling"; ACM Transactions on Graphics, ACM, NY, US, vol. 23. No. 3, Aug. 1, 2004, pp. 630-634.

* cited by examiner

Figure 8

COMPUTER AIDED DESIGN (CAD)-BASED FOAM PART GENERATION FOR SEAT DESIGNS

BACKGROUND

Computer systems can be used to create, use, and manage data for products and other items. Examples of computer systems include computer-aided design (CAD) systems (which may include computer-aided engineering (CAE) systems), visualization and manufacturing systems, product data management (PDM) systems, product lifecycle management (PLM) systems, and more. These systems may include components that facilitate design and simulated testing of product structures and product manufacture.

BRIEF DESCRIPTION OF THE DRAWINGS

Certain examples are described in the following detailed description and in reference to the drawings.

DETAILED DESCRIPTION

Modern seat designs have become increasingly complex. Automotive seats, for example, may include elaborately styled surfaces with precise seam positioning, multiple comfort requirements at different seat positions, complex frame assemblies, embedded heating or cooling elements, electronics, sensors, and various other design components. Foam parts of seat designs may provide an internal seat component to provide cushioning and seat solidity. However, foam parts may be required to fit (precisely) into seat designs with increasing complexity. Accordingly, foam design for seats may require accounting for many different seat design variables to ensure a proper geometry, thickness, and density. Manual foam design can be time-consuming and error-prone. Moreover, if seat parameters change during design phases, foam designs may need to be correspondingly adjusted, which may further delay product design or result in manual computation errors.

The disclosure herein may provide systems, methods, devices, and logic for CAD-based foam part generation. As described in greater detail below, the CAD-based foam part generation features described herein may support foam part generations with increased accuracy, efficiency, and flexibility. In particular, a CAD-integrated system may access a CAD seat surface representative of a seat design as well as aggregate seat parameters for seat designs from various sources. Based on the accessed CAD seat surface and collected seat parameters, the CAD-based foam part generation features described herein may support automatic generation of foam parts for the seat designs. Example parameters that may be accounted for include foam offsets, comfort requirements (e.g., as specified via foam density, foam supports, force outputs, etc.), surface tensions, surface attachment strategies, and internal geometries as impacted by seat assemblies, electronics, etc. By centralizing foam generation and accounting for a plurality of different surfaces and seat parameters, the CAD-based foam part generation features described herein may improve generation of foam parts for seat designs.

These and other CAD-based foam part generation features are described in greater detail herein.

Figure 1:
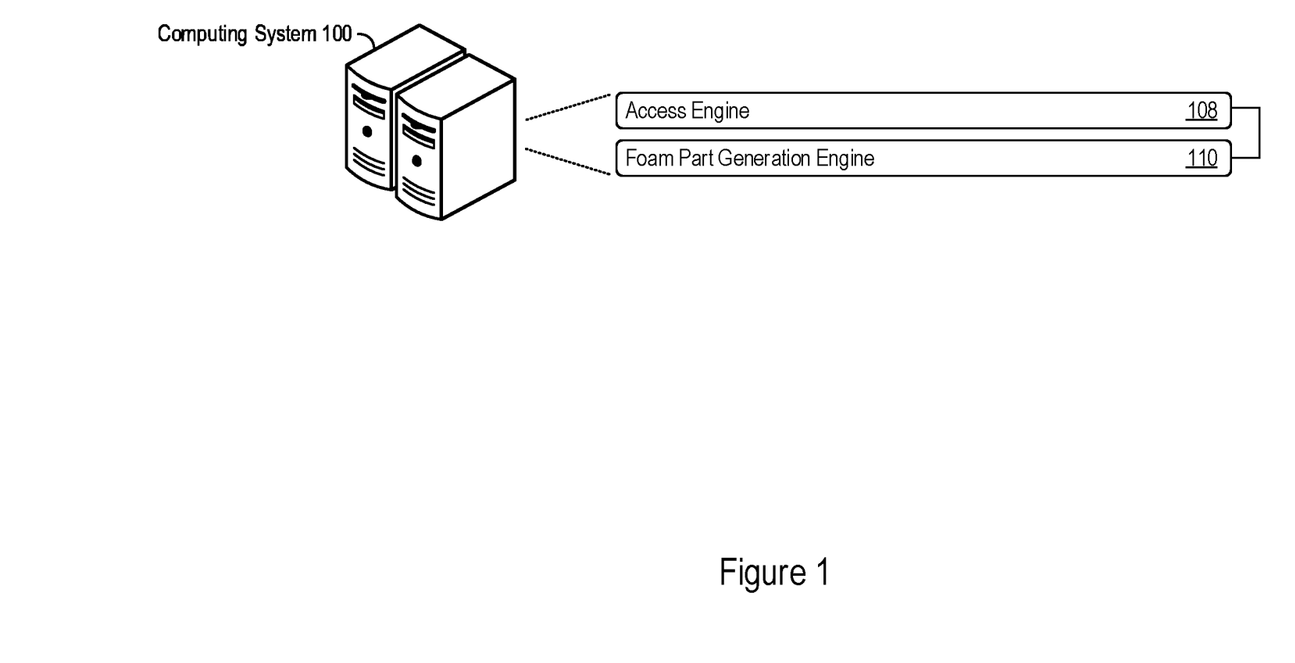
FIG. 1 shows an example of a computing system that supports CAD-based foam part generation for seat designs.

FIG. 1 shows an example of a computing system 100 that supports CAD-based foam part generation for seat designs. The computing system 100 may take the form of a single or multiple computing devices such as application servers, compute nodes, desktop or laptop computers, smart phones or other mobile devices, tablet devices, embedded controllers, and more. In some examples, the computing system 100 implements a CAD tool or CAD program through which a user may design and simulate testing of product structures, such as seat designs.

As an example implementation to support any combination of the CAD-based foam generation features described herein, the computing system 100 shown in FIG. 1 includes an access engine 108 and a foam part generation engine 110. The computing system 100 may implement the engines 108 and 110 (including components thereof) in various ways, for example as hardware and programming. The programming for the engines 108 and 110 may take the form of processor-executable instructions stored on a non-transitory machine-readable storage medium and the hardware for the engines 108 and 110 may include a processor to execute those instructions. A processor may take the form of single processor or multi-processor systems, and in some examples, the computing system 100 implements multiple engines using the same computing system features or hardware components (e.g., a common processor or a common storage medium).

In operation, the access engine 108 may access a CAD seat surface that represents a seat surface of a seat design and access seat parameters for the seat design. In operation, the foam part generation engine 110 may construct a CAD foam part for the seat design based on the CAD seat surface and the seat parameters. These and other CAD-based foam part generation features according to the present disclosure are described in greater detail next.

Figure 2:
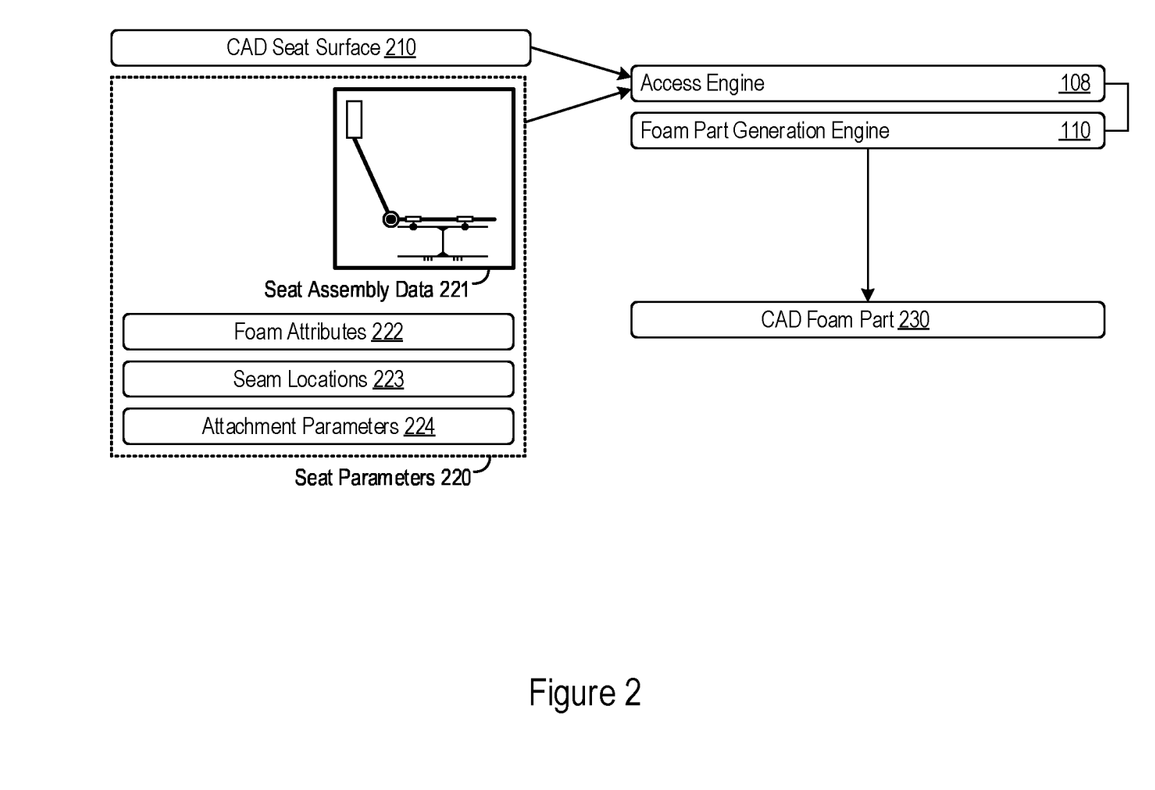
FIG. 2 shows an example generation of a CAD foam part by an access engine and a foam part generation engine.

FIG. 2 shows an example generation of a CAD foam part by the access engine 108 and the foam part generation engine 110. In supporting CAD-based foam part generations, the access engine 108 may access various types of data to support foam generation for a seat design. In the particular example shown in FIG. 2, the access engine 108 accesses a CAD seat surface 210 and seat parameters 220 for a seat design.

A CAD seat surface 210 accessed by the access engine 108 may include any 3D surface representative of a seat surface design. The CAD seat surface 210 may be 3-dimensional (3D), and may thus take the form of a 3D modeled or faceted surface. The CAD seat surface 210 may, in some instances define both an external seat surface (e.g., the exterior of the seat) and an inner seat boundary, which may thus define a thickness of materials/fabrics used to construct the seat surface. Put another way, the CAD seat surface 210 may represent a specific seat component, that is the surface material (e.g., fabric or leather) of a seat design or portions thereof. The CAD seat surface 210 may be represented as any type of CAD file, which the access engine 108 may retrieve, load, or otherwise access from a CAD tool used to design the CAD seat surface 210 or from a data structure used to store the CAD seat surface 210. The CAD seat surface 210 may represent a particular seat portion (e.g., head rest, or seat cushion) or may comprise multiple portions of a seat design.

In supporting CAD-based foam part generation, the access engine 108 may access seat parameters for a seat design. As used herein, seat parameters may refer to any design requirement, configuration, value, structure, constraint, or other parameter that defines one or more aspects of a seat design. Some examples of seat parameters are shown in FIG. 2 through the seat parameters 220, which may include seat assembly data 221, foam attributes 222, seam locations 223, and attachment parameters 224. Each of these are described in turn. Any number of additional or alternative seat parameters are contemplated herein with regards to CAD-based foam part generations.

Seat assembly data 221 accessed by the access engine 108 may include any attributes of any internal physical structures that comprise a seat design. Such internal structures may include a seat frame, internal seat electronics or sensors, or any other physical structures enclosed by a seat surface represented by the CAD seat surface 210 or otherwise positioned internally within a seat design. As described below, the seat assembly data 221 may be used to define foam boundaries in CAD-based foam part generations, and access of the seat assembly data 221 may support the construction of foam parts with increased precision and accuracy. In some implementations, the seat assembly data 221 may be defined in a common 3D coordinate system as the CAD seat surface 210. In other examples, the access engine 108 may translate accessed seat assembly data 221 into a common 3D coordinate system with respect to the CAD seat surface 210, which may define a 3D space in which components of a seat design can be commonly analyzed and utilized for foam part generations.

As another example, the seat parameters 220 illustrated in FIG. 2 include foam attributes 222. The foam attributes 222 may specify particular characteristics or requirements for a foam part of a seat design, and the access engine 108 may aggregate any number of foam attributes 222 for CAD-based foam generations. Example foam attributes include foam densities, foam materials, positional offsets from the CAD seat surface 210 (e.g., relative to an exterior surface of the seat), comfort requirements, overbuild sections, etc. In some instances, the foam attributes 222 include characteristics of foam generations processes used to physically construct foam parts, e.g., flow rates, cross-section issues, and other characteristics that may impact the physical construction of foams using flow techniques and foam molds. Foam attributes 222 may impact foam part design, and access of the foam attributes 222 may increase the accuracy by which CAD-based foam parts are constructed.

With regard to comfort requirements and overbuild sections that may be included as foam attributes 222, seat designs may vary with different "comfort" parameters of a seat at different seat positions, such as plushness, firmness, or other characteristics that define a "feel" of the seat. Comfort analyses may be performed via finite element analysis (FEA) on different seat components and specify particular support levels as measured via force (e.g., force normal or perpendicular to a seat surface point). For sporty seat designs, the FEA may specify more support (e.g., an increased force value) at different seat positions whereas luxury seat designs may specify less support (e.g., a decreased force value) at the seat positions. Increased force values may be accomplished via foam overbuilds, in which the geometry of a constructed foam part extends past a seat surface, and is then compressed within the seat surface during manufacture (thus producing increased force applied by the foam pressing outwards at the foam overbuild sections). Decreased force values may be accomplished via foam underbuilds. Any type of comfort-based seat parameters may be collected by the access engine 108 as part of the foam attributes 222.

As other examples of seat parameters 220 shown in FIG. 2, the access engine 108 may access seam locations 223 and attachment parameters 224 for a seat design. The seam locations 223 and attachment parameters 224 may define specific characteristics by which surface materials (e.g., fabrics) of a seat are attached together to one another or otherwise affixed to other seat components (e.g., a foam part or seat assembly). Attachments to other seat components may, for example, occur at the seam locations 223. The attachment parameters 224 may specify specific attachment strategies specific to a seat design, e.g., at seat-wide granularity, at an individual attachment-granularity, or granularities in between. In some instances, the attachment parameters 224 may specify a type of trench (or other physical insertion configuration or design) to insert into a seat design in order to embed hooks or other attachment components to internally affix a seat surface. As such, the attachment parameters 224 may include trench sizes, depths, shapes, profiles, or other characteristics and configurations for inserted trenches to attach seat surfaces to internal seat components.

While some examples of seat parameters 220 are presented above, any additional or alternative parameters that impact any part of a seat design are contemplated herein. Moreover, the access engine 108 may access the seat parameters 220 from any number of sources, such as CAD systems used to design the CAD seat surface 210 and/or seat assemblies, simulation and FEA systems used to determine comfort characteristics of a seat design, user input for specific seat design parameters as specified by seat designers, engineers, or customers, etc. The access engine 108 may store the accessed CAD seat surface 210 and seat parameters 220 in any suitable data structure(s), which the access engine 108 may implement locally or remotely access.

Turning to generation of foam parts, the foam part generation engine 110 may generate a CAD foam part 230 based on the CAD seat surface 210 and the accessed seat parameters 220. The CAD foam part 230 may be any representation of a foam part for a seat design, whether as a 3D surface or 3D object representative of a foam part (e.g., used to construct a foam mold), cross-sections of the foam part at various points, or combinations of both. In constructing the CAD foam part 230, the foam part generation engine 110 may collectively account for the CAD seat surface 210 (or applicable portions thereof) and seat parameters 220 (or applicable parameters thereof) to generate the CAD foam part 230. In particular, the foam part generation engine 110 may define the shape of the CAD foam part 230 to account boundaries defined by the CAD seat surface 210 and seat assembly data 221 and exhibit particular characteristics or geometries as required by the foam attributes 222, seam locations 223, attachment parameters 224, and/or any additional or alternative seat parameters 220.

By aggregating the CAD seat surface 210 and seat parameters 220 via the access engine 110, CAD foam part generations by the foam part generation engine 110 may be centralized. Any update during design or testing to specific seat characteristics may impact foam properties. The access engine 108 may identify any changes to the CAD seat surface 210 and seat parameters 220, by which the foam part generation engine 110 may adaptively and flexibly update the CAD foam part 230. As compared to decentralized computation of seat design characteristics (including foam generation), the access engine 108 and foam part generation engine 110 may provide a centralized foam part generation system that increases the efficiency and reduces operational costs of seat design.

Example features the foam part generation engine 110 may support in CAD-based foam part generations are described in greater detail next in connection with FIGS. 3-6. While many of the features in FIGS. 3-6 are depicted and described via 2-dimensional (2D) cross sections, the features may be consistently applied by the foam part generation engine 110 in 3D (e.g., with 2D curves or lines being consistently defined as 3D planes or surfaces).

Figure 3:
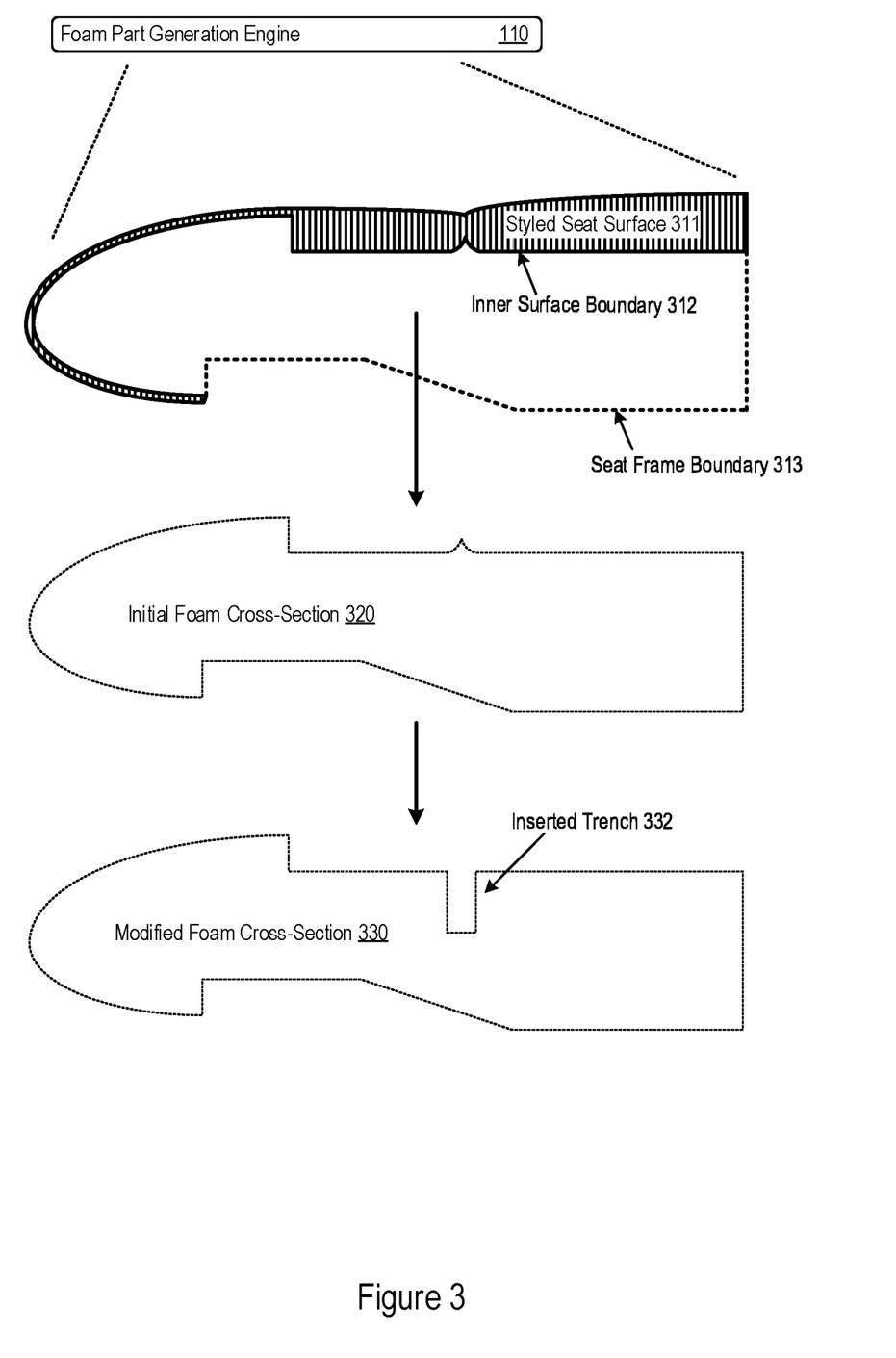
FIG. 3 shows examples of foam geometries that the foam part generation engine may determine in support of CAD-based foam part generation.

FIG. 3 shows examples of foam geometries that the foam part generation engine 110 may determine in support of CAD-based foam part generation. In some implementations, the foam part generation engine 110 may determine an initial geometry for a CAD foam part, from which subsequent foam modifications are performed to account for different seat parameters. For instance, the foam part generation engine 110 may compute an initial volume of a CAD foam part with foam boundaries set by an accessed CAD seat surface and other seat components determined through accessed seat assembly data.

One such example is shown in FIG. 3, which depicts a cross-section of a seat design that includes a styled seat surface 311 (with an inner surface boundary 312) as well as a seat frame boundary 313. As seen in FIG. 3, the styled seat surface 311 is visualized as the portions patterned with vertical lines. Although not illustrated in detail in FIG. 3, the patterned portions that represent the styled seat surface 311 may include fabrics, layers, or other material that together form a seat surface. In that regard, a seat surface may itself be represented as a 3D volume in a seat design (e.g., with multiple fabric components, layers, or other elements), and the foam part generation engine 110 may determine foam boundaries based on the geometry of the styled seat surface 311. In FIG. 3, the foam part generation engine 110 identifies the inner surface boundary 312 of the styled seat surface 311 as a foam boundary for an initial geometry of a CAD foam part as a CAD foam part may be designed to directly abut (at least at parts) against the inner surface boundary 312 of the styled seat surface 311. In other examples, the foam part generation engine 110 may access offset values to determine foam boundaries, whether offset from the inner surface boundary 312, an exterior surface of the styled seat surface 311, selected positions embedded in the styled seat surface 311, or combinations thereof.

In determining an initial geometry, the foam part generation engine 110 may also bound a CAD foam part based on other internal or non-seat surface components of a seat design. In FIG. 3, the foam part generation engine 110 bounds an initial geometry of a CAD foam part based on the seat frame boundary 313, which may include specific metal, frame, or physical constructs that form the seat design. Other physical bounding elements that the foam part generation engine 110 may account for include seat sensors, mechanical elements, or other "hard" physical structures that the foam part generation engine 110 may identify or otherwise extract from accessed seat parameters (e.g., seat assembly data 221 as described above in connection with FIG. 2).

In FIG. 3, the foam part generation engine 110 computes the initial foam cross-section 320 for a seat design. To do so, the foam part generation engine 110 may define foam boundaries for the initial foam cross-section 320 specifically as the styled seat surface 311 (and particularly the inner surface boundary 312) and the seat frame boundary 313. The foam part generation engine 110 may compute the space encapsulated by determined foam boundaries as an initial geometry for a CAD foam part.

While FIG. 3 illustrates an initial foam cross section 320 in 2D, the foam part generation engine 110 may determine a 3D initial geometry for a CAD foam part as a computed volume bounded by CAD surfaces for a seat design, internal assemblies and components (e.g., seat frame boundaries), and other non-foam seat elements. For instance, the foam part generation engine 110 may map a CAD seat surface and identified seat components into a 3D space and extract a volume bounded by the CAD seat surface and mapped seat components as an initial geometry for a CAD foam part. Such extraction may be performed via 3D volume fill or extraction CAD operations, for example.

In some implementations, the foam part generation engine 110 may modify an initial geometry of a CAD foam part to account for any number of seat parameters. In the example shown in FIG. 3, the foam part generation engine 110 modifies the initial foam cross-section 320 into the modified foam cross-section 330, which includes the inserted trench 332. In doing so, the foam part generation engine 110 may identify a seam location in the styled seat surface 311 and an attachment strategy for affixing the styled seat surface 311 to a foam part at the seam location. Based on the identified seam location and attachment strategy, the foam part generation engine 110 may add the inserted trench 332 into the CAD foam part to support seat surface attachment during physical manufacture. The inserted trench 332 is just one example of a foam modifications that the foam part generation engine 110 may perform, and further examples of foam modification features and foam generation features are described next in connection with FIGS. 4-6.

Figure 4:
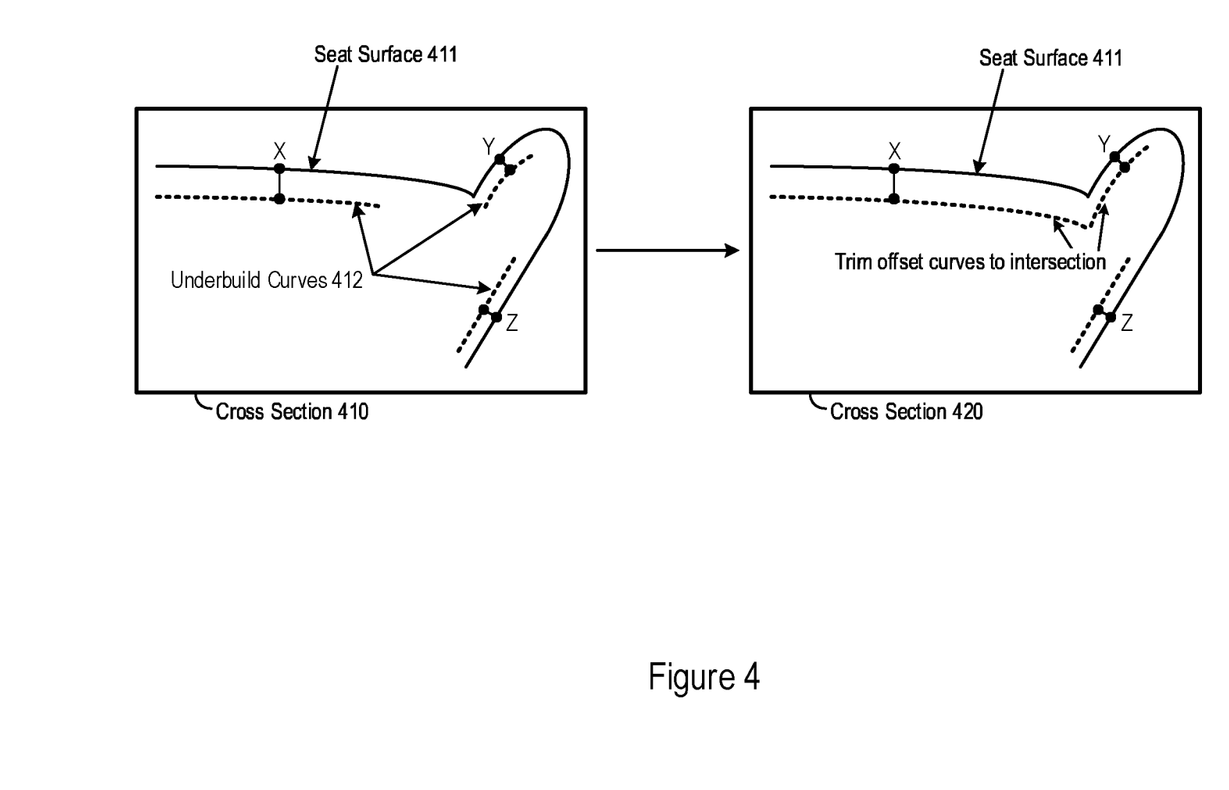
FIG. 4 shows an example of foam part geometry determinations by the foam part generation engine through underbuild curves.

FIG. 4 shows an example of foam part geometry determinations by the foam part generation engine 110 through underbuild curves. In FIG. 4, a cross section 410 of a seat design is illustrated with a seat surface 411. In constructing a foam part, the foam part generation engine 110 may determine that accessed seat parameters include underbuild offsets at multiple points on the seat surface.

In FIG. 4, example underbuild offsets are illustrated points on the seat surface 411 labeled as X, Y, and Z. The seat surface 411 may, for example, represent an exterior surface of a seat design or an interior surface of seat surface material (e.g., the inner surface boundary 312 of a styled seat surface 311). Offset values at points X, Y, and Z of the seat surface 411 may be determined via comfort analysis and accessed from product simulation or FEA systems, and in FIG. 4, each of offsets for X, Y, and Z specify a respective (and different) foam offset value for a foam part of the seat design. Although illustrated as specific offset points in FIG. 4, the foam part generation engine 110 may interpret offset curves, offset planes, or other forms of offset indicators in a similar manner in accessing seat parameters for foam part construction.

In constructing a CAD foam part (or modifying an initial geometry of a CAD foam part), the foam part generation engine 110 may account for the offset seat parameters. In the particular example shown in FIG. 4, the foam part generation engine 110 may construct the CAD foam part to offset the seat surface at the multiple points X, Y, and Z by the respective underbuild offsets as specified in accessed seat parameters. Moreover, the foam part generation engine 110 may generate underbuild curves of the CAD foam part from the underbuild offsets, wherein the underbuild curves may represent boundaries of the CAD foam part. Example underbuild curves are shown in FIG. 4 as the underbuild curves 412.

The foam part generation engine 110 may generate a respective underbuild curve for each underbuild offset parameter. In FIG. 4, the underbuild curves 412 include a respective underbuild curve for points X, Y, and Z, which may be referred to as underbuild curve$_X$, underbuild curve$_Y$, and underbuild curve$_Z$ respectively. To generate the underbuild curves 412, the foam part generation engine 110 may construct parallel curves from portions of the seat surface 411 offset by the respective underbuild offsets of points X, Y, and Z. As such, the foam part generation engine 110 may generate underbuild curve$_X$ to be parallel to portions of the seat surface 411, and in a consistent manner generate underbuild curve$_Y$ and underbuild curve$_Z$. For 3D representations, the foam part generation engine 110 may generate offset planes instead of curves.

As different portions of a seat design may be configured with different underbuild offsets, the foam part generation engine 110 may construct a CAD foam part such that different underbuild curves or underbuild planes are blended together. One example of such a feature is shown in FIG. 4 through the cross section 420, in which the foam part generation engine 110 may trim underbuild curves at curve intersection points. In some implementations, the foam part generation engine 110 progressively extends an underbuild curve (or plane) from a point in the seat design until a geometric discontinuity is identified in the seat surface 411. Identification of geometric discontinuities may be based on various discontinuity criteria, such as the when the angle at different points in a surface curve (or plane) of the seat surface 411 exceeds a certain threshold angle. Discontinuity criteria may be used to determine bends or corners in a seat surface. In other examples, accessed seat parameters may specify certain ranges or seat design portions at which particular underbuild offsets apply, and the foam part generation engine 110 may limit generated underbuild curves to the seat portions (or beyond the specified range by a predetermined extension value).

In FIG. 4, the foam part generation engine 110 may extend underbuild curve$_X$ and underbuild curve$_Y$ and determine a curve intersection when the two underbuild curves intersect. In doing so, the foam part generation engine 110 may determine an intersection point (or intersection curve for 3D offset planes) at which to trim a boundary of a CAD foam part. Thus, the foam part design engine 110 may merge underbuild curve$_X$ and underbuild curve$_Y$ at an intersection point to construct foam boundaries of a CAD foam part. In any of the ways described herein, the foam part generation engine 110 may trim underbuild curves at curve intersections to form trimmed corners of a CAD foam part. Additionally or alternatively, the foam part generation engine 110 may perform foam modifications for overbuild regions, as described next.

Figure 5:
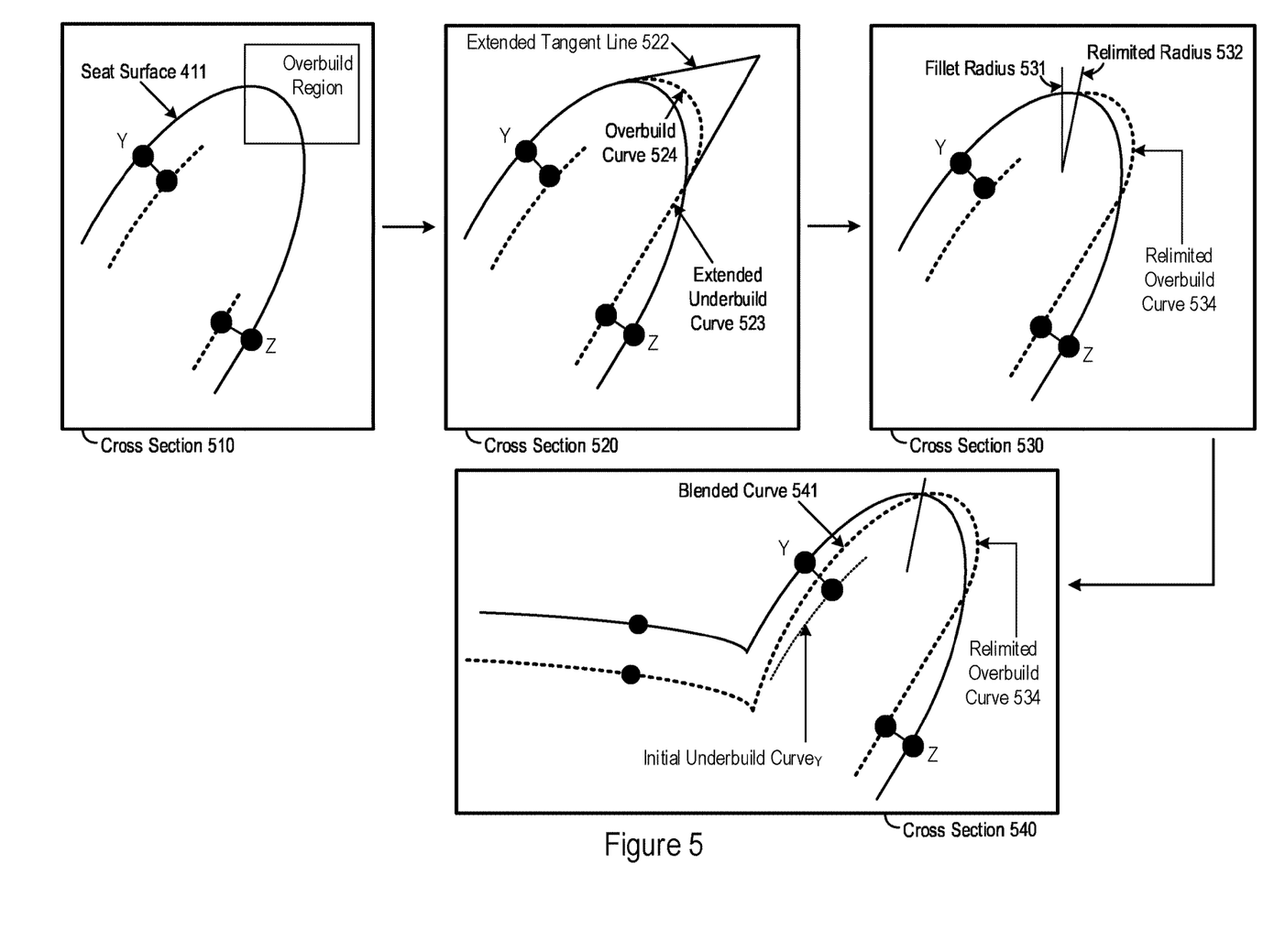
FIG. 5 shows an example of foam modifications that the foam part generation engine may make to account for overbuild regions.

FIG. 5 shows an example of foam modifications that the foam part generation engine 110 may make to account for overbuild regions. In FIG. 5, multiple cross sections of a seat design are depicted to illustrate various foam modifications that the foam part generation engine 110 may perform via an example subsection of the seat design shown in FIG. 4.

In the cross section 510 shown in FIG. 5, an overbuild region is illustrated for a seat portion along the seat surface 411 between points Y and Z of a seat design. The foam part generation engine 110 may identify the overbuild region based on accessed seat parameters. In some instances, accessed seat parameters specify a target foam density or normal force to exert at selected portions of a seat design, and the foam part generation engine 110 may compute the overbuild regions (including amount of foam overbuild) from such seat parameters. In other examples, product simulation or FEA systems may determine the extent to which foam should extend beyond the seat surface 411 at a particular point (e.g., as an overbuild offset), from which the foam part generation engine 110 may determine the overbuild region. In yet other examples, the access parameters may explicitly specify the specific portion of a seat design in which a foam overbuild is to be implemented, including the amount of the overbuild (e.g., as an overbuild offset value, curve, or plane from a seat surface).

The foam part generation engine 110 may construct a CAD foam part to include overbuild regions in accordance with accessed seat parameters. As seen in FIG. 5, a seat design may include an overbuild region or overbuild offset adjacent to seat portions configured with underbuild offsets. To account for an overbuild region or overbuild offset, the foam part generation engine 110 may generate an overbuild curve for the overbuild region, but do so in connection with determined underbuild curves, such as the underbuild curve$_Y$ and underbuild curve$_Z$ illustrated as dotted curves in the cross section 510.

To illustrate further through the cross section 520 shown in FIG. 5, the foam part generation engine 110 may generate an overbuild curve for a determined overbuild region while accounting for underbuild curve$_Y$ and underbuild curve$_Z$. In some implementations, the foam part generation engine 110 generates an overbuild curve via tangent lines and underbuild curve extensions. To illustrate through the cross section 520, the foam part generation engine 110 may extend a line from at least one tangent point along the seat surface 411, e.g., a tangent line parallel to the underbuild curve$_Y$ shown as the extended tangent line 522 in the cross section 520. Also shown in the cross section 520, the foam part generation engine 110 may extend at least one underbuild curve to intersect the seat surface 411, shown as the extended underbuild curve 523 in the cross section 520. In other examples, the foam part generation engine 110 may extend multiple underbuild curves to generate the overbuild curve (e.g., extending offset curve$_Y$ instead of the extended tangent line 522) or extend multiple tangent lines to generate the overbuild curve (e.g., extending a tangent point parallel to offset curve$_Z$ instead of the extended underbuild curve 523).

The foam part generation engine 110 may generate the overbuild curve 524 between the tangent point from which the extended tangent line 522 is projected and the point at which the extended underbuild curve 523 intersects the seat surface 411 (or any other points on the seat surface 411 determined by the foam part generation engine 110). Various curve generation techniques may be employed by the foam part generation engine 110 to generate the overbuild curve 524, such as inserting a fillet curve with a radius value determined based on seat parameters (e.g., as determined via comfort analyes, user input, or predetermined configurations).

In some implementations, the foam part generation engine 110 may relimit (e.g., adjust) a fillet radius to modify a generated overbuild curve 524. An example of such a feature is shown through the cross section 530 shown in FIG. 5. The foam part generation engine 110 may relimit the fillet radius 531 shown in the cross section 530 by a configured number of degrees (or radians), for a specified distance along the seat surface 411, or according to any other configurable measure. Moreover, the foam part generation engine 110 may relimit the fillet radius 531 in any direction, whether to decrease or increase an overbuild region. Any of these configurations may be specified via seat parameters as accessed by the access engine 108. In the example shown in the cross section 530, the foam part generation engine 110 modifies the fillet radius to a different position shown through the relimited radius 532 and modifies the overbuild curve 524 into the relimited overbuild curve 534 according to the updated positioning of the relimited radius 532.

As seen in the cross section 530, the relimited overbuild curve 534 may connect to the extended overbuild curve 523, thus linking to underbuild curve$_Z$. To account for and connect to underbuild curve$_Y$, the foam part generation engine 110 may blend the underbuild curve$_Y$ into the relimited overbuild curve 534. That is, the foam part generation engine 110 may blend a portion of an overbuild curve with a portion of an adjacent underbuild curve of the CAD foam part to form a blended curve. As illustrated through the cross section 540, the foam part generation engine 110 may blend the underbuild curve$_Y$ (as initially determined and labeled as the initial underbuild curve$_Y$) with the relimited overbuild curve 534.

In some cases, blending techniques between offset and overbuild curves (or planes) may result in geometric discontinuities. As discussed above, the foam part generation engine 110 may identify geometric discontinuities via a variety of discontinuity criteria, which may be specified according to angular thresholds, curve or parametric characteristics, or according to any other criteria to quantify abrupt changes in curvature. In blending an overbuild curve with an adjacent underbuild curve, the foam part generation engine 110 may interpolate a portion of the blended curve to reduce or eliminate the geometric discontinuity. For example, the foam part generation engine 110 may hold end points of a blended curve and use a number of degrees of freedom (e.g., n=5) to interpolate the blended curve into the tangent point of an overbuild curve to the seat surface 411. Additionally or alternatively, the foam part generation engine 110 may utilize any number of curve smoothing techniques or algorithms to blend overbuild curves with adjacent underbuild curves.

Figure 6:
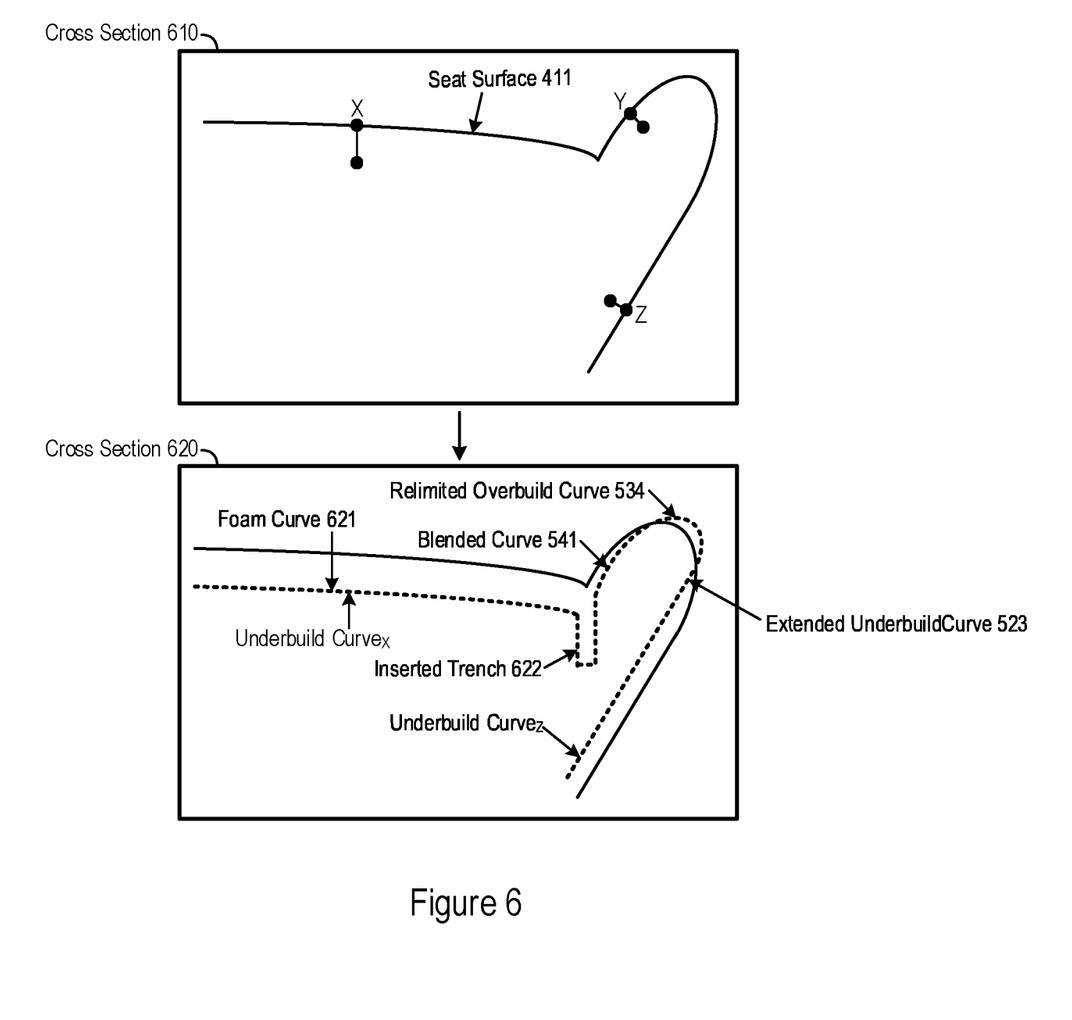
FIG. 6 shows an example of a foam boundary that the foam part generation engine may compute for a seat design.

In any combination of the ways described herein, the foam part generation engine 110 may account for overbuild regions in construction of CAD foam parts FIG. 6 shows an example of a foam boundary that the foam part generation engine 110 may compute for a seat design. In FIG. 6, the cross section 610 is illustrated that includes the seat surface 411 (as consistently described in connection with FIGS. 4 and 5) with underbuild offsets at points X, Y, and Z. Cross section 620 shown in FIG. 6 illustrates a foam curve 621 the foam part generation engine 110 may determine by performing any combination of the foam part generation features described for FIGS. 3, 4, and 5 or otherwise herein.

As seen in the cross section 620, the computed foam curve 621 includes the underbuild curve$_X$, the blended curve 541, the relimited overbuild curve 534, and the extended underbuild curve 523 (which includes underbuild curve$_Z$). As also shown in the cross section 620, the foam part generation engine 110 may modify a foam boundary to include trenches at attachment points for styled seat surfaces, such as the inserted trench 622 in FIG. 6. In effect, the foam curve 621 may serve as an outer boundary for a CAD foam part constructed by the foam part generation engine 110. The foam curve 621 determined by the foam part generation engine 110 may account for a shape of a styled seat surface (e.g., via the offsets to the seat surface 411), accessed underbuild offsets, determined overbuild regions, seam locations and attachment points, and any number of additional or alternative seat parameters. In a consistent manner, the foam part generation engine 110 may determine an entire foam boundary that encapsulates a CAD foam part, and in a way that accounts for CAD seat surfaces and a plurality of accessed seat parameters. And while the cross section 620 illustrates a 2D foam curve 621, the foam part generation engine 110 may generate a 3D volume for a CAD foam part in a consistent manner as described herein.

Accordingly, the foam part generation engine 110 may construct a CAD foam part based on accessed CAD seat surfaces and seat parameters for a seat design.

Figure 7:
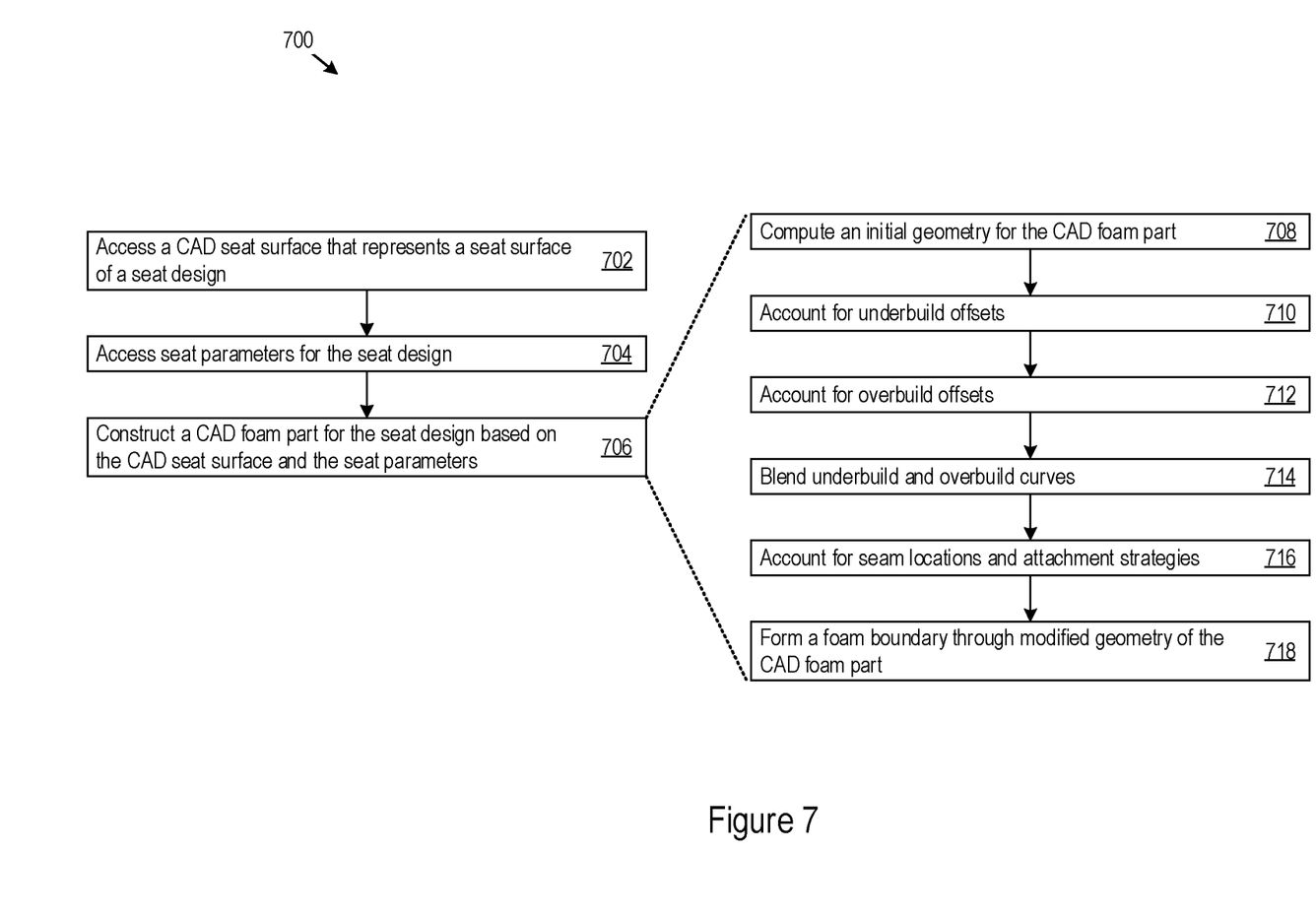
FIG. 7 shows an example of logic that a system may implement to support CAD-based foam part generation for seat designs.

FIG. 7 shows an example of logic 700 that a system may implement to support CAD-based foam part generation. For example, the computing system 100 may implement the logic 700 as hardware, executable instructions stored on a machine-readable medium, or as a combination of both. The computing system 100 may implement the logic 700 via the access engine 108 and the foam part generation engine 110, through which the computing system 100 may perform or execute the logic 700 as a method to support CAD-based foam part generation. The following description of the logic 700 is provided using the access engine 108 and the foam part generation engine 110 as examples. However, various other implementation options by the computing system 100 are possible.

In implementing the logic 700, the access engine 108 may access a CAD seat surface that represents a seat surface of a seat design (702) and access seat parameters for the seat design (704), e.g., in any of the ways described herein. In implementing the logic 700, the foam part generation engine 110 may construct a CAD foam part for the seat design based on the CAD seat surface and the seat parameters (706). The foam part generation engine 110 may construct the CAD foam part as a 3D volume, multiple 2D cross sections of a foam part, or combinations of both.

In some implementations, the foam part generation engine 110 may construct the foam CAD part by computing an initial geometry for the CAD foam part (708), doing so by defining foam boundaries as the accessed CAD seat surface (or portions thereof) and other physical components of the seat design. In constructing the CAD foam part, the foam part generation engine 110 may account for underbuild offsets (710) and overbuild offsets (712). For instance, the foam part generation engine 110 may generate underbuild and overbuild curves (or planes), configured and constructed according to accessed seat parameters. Moreover, the foam part generation engine 110 may blend curves (or planes) together (714), whether by trimming curves at intersection points or by applying curve blending techniques to merge adjacent overbuild and underbuild geometries. Additionally or alternatively, the foam part generation engine 110 may account for seam locations and attachment strategies (716), doing so by inserting trenches or other foam shapes into the CAD foam part to support physical attachment. In any of these ways (and more), the foam part generation engine 110 may perform foam modifications to a initial geometry to account for various seat parameters of a seat design. Accordingly, the foam part generation engine 110 may form a foam boundary through the modified geometry of the CAD foam part (718).

The logic 700 shown in FIG. 7 provides but one example by which a computing system 100 may support CAD-based foam part generation. Additional or alternative steps in the logic 700 are contemplated herein, including according to any features described for the access engine 108, foam part generation engine 110, or any combinations thereof. While some example steps are shown in FIG. 7 by which a CAD foam part can be constructed according to the present disclosure, any number of additional or alternative features described herein are likewise contemplated.

Figure 8:
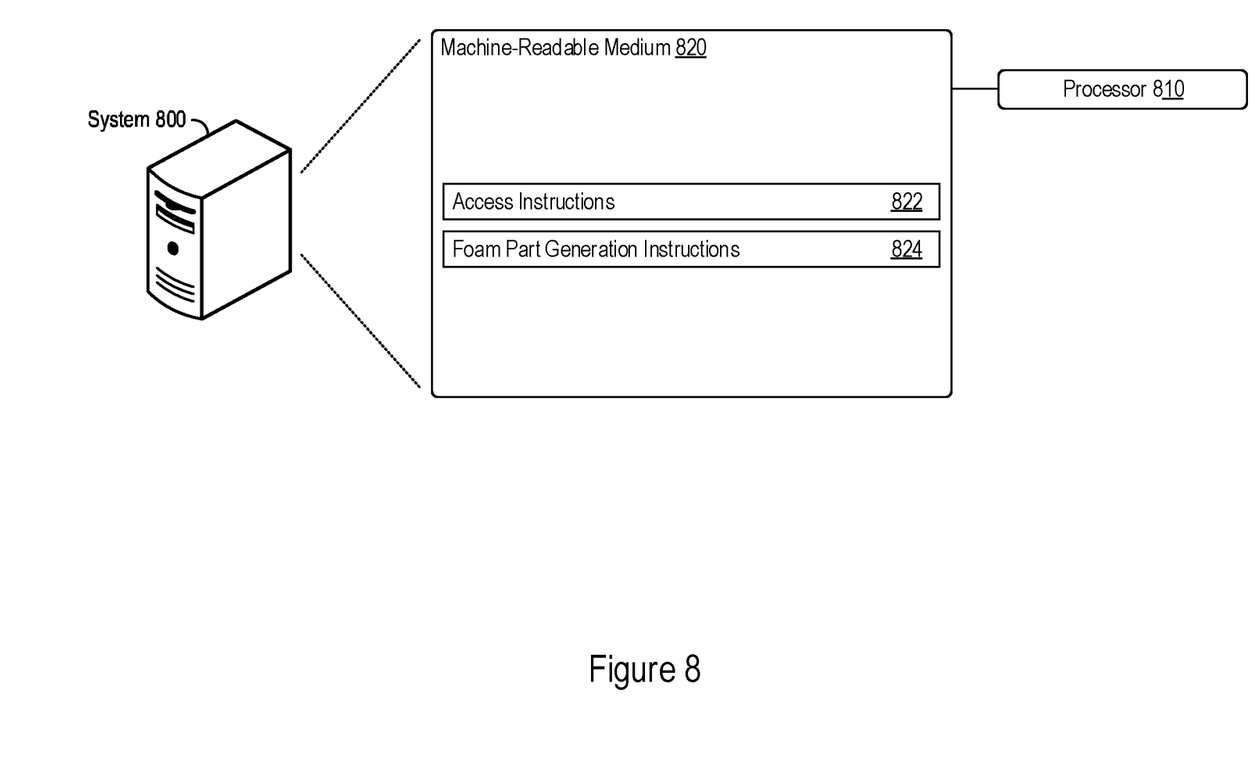
FIG. 8 shows an example of a system that supports CAD-based foam part generation for seat designs.

FIG. 8 shows an example of a system 800 that supports CAD-based foam part generation. The system 800 may include a processor 810, which may take the form of a single or multiple processors. The processor(s) 810 may include a central processing unit (CPU), microprocessor, or any hardware device suitable for executing instructions stored on a machine-readable medium. The system 800 may include a machine-readable medium 820. The machine-readable medium 820 may take the form of any non-transitory electronic, magnetic, optical, or other physical storage device that stores executable instructions, such as the access instructions 822 and the foam part generation instructions 824 shown in FIG. 8. As such, the machine-readable medium 820 may be, for example, Random Access Memory (RAM) such as a dynamic RAM (DRAM), flash memory, spin-transfer torque memory, an Electrically-Erasable Programmable Read-Only Memory (EEPROM), a storage drive, an optical disk, and the like.

The system 800 may execute instructions stored on the machine-readable medium 820 through the processor 810. Executing the instructions (e.g., the access instructions 822 and/or the foam part generation instructions 824) may cause the system 800 to perform any of the CAD-based foam part generation features described herein, including according to any of the features with respect to the access engine 108, the foam part generation engine 110, or a combination of both.

For example, execution of the access instructions 822 by the processor 810 may cause the system 800 to access a computer-aided design (CAD) seat surface that represents a seat surface of a seat design and access seat parameters for the seat design. Execution of the foam part generation instructions 824 by the processor 810 may further cause the system 800 to construct a CAD foam part for the seat design based on the CAD seat surface and the seat parameters.

Any additional or alternative features as described herein may be implemented via the access instructions 822, foam part generation instructions 824, or a combination of both.

The systems, methods, devices, and logic described above, including the access engine 108 and the foam part generation engine 110, may be implemented in many different ways in many different combinations of hardware, logic, circuitry, and executable instructions stored on a machine-readable medium. For example, the access engine 108, the foam part generation engine 110, or combinations thereof, may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine-readable instructions stored on the medium, which when executed in an endpoint, computer system, or other device, cause the device to perform operations according to any of the description above, including according to any features of the access engine 108, the foam part generation engine 110, or combinations thereof.

The processing capability of the systems, devices, and engines described herein, including the access engine 108 and the foam part generation engine 110, may be distributed among multiple system components, such as among multiple processors and memories, optionally including multiple distributed processing systems or cloud/network elements. Parameters, databases, and other data structures may be separately stored and managed, may be incorporated into a single memory or database, may be logically and physically organized in many different ways, and may be implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

While various examples have been described above, many more implementations are possible.

The invention claimed is:

1. A method comprising:
   by a computing system:
   accessing a computer-aided design (CAD) seat surface that represents a seat surface of a seat design;
   accessing seat parameters for the seat design; and
   automatically constructing a CAD foam part for the seat design based on the accessed CAD seat surface and the accessed seat parameters, wherein the CAD foam part represents an internal foam component of the seat design that is to be covered by a surface material represented through the CAD seat surface,
   wherein the seat parameters comprise an overbuild section indicative that a geometry of a section of the internal foam component is to extend past the seat surface of the seat design, and
   wherein constructing the CAD foam part comprises constructing an overbuild curve of the CAD foam part to extend past the CAD seat surface at the overbuild section.

2. The method of claim 1, wherein the seat parameters comprise a seam location on the seat surface and an attachment point; and
   wherein constructing the CAD foam part comprises inserting a trench into the CAD foam part for the seam location to reach the attachment point.

3. The method of claim 1, wherein the seat parameters comprise underbuild offsets at multiple points on the seat surface; and
   comprising constructing the CAD foam part to offset the seat surface at the multiple points by the underbuild offsets.

4. The method of claim 3, wherein constructing the CAD foam part further comprises:
   generating underbuild curves of the CAD foam part from the underbuild offsets; and
   trimming the underbuild curves at a curve intersection to form a trimmed corner of the CAD foam part.

5. The method of claim 1, wherein constructing the CAD foam part further comprises blending a portion of the overbuild curve with a portion of an adjacent underbuild curve of the CAD foam part to form a blended surface curve.

6. The method of claim 5, wherein blending the overbuild curve with the adjacent underbuild curve comprises interpolating a portion of the blended surface curve to reduce or eliminate a geometric discontinuity.

7. A system comprising: an access engine configured to:
  access a computer-aided design (CAD) seat surface that represents a seat surface of a seat design; and
  access seat parameters for the seat design; and
  a foam part generation engine configured to automatically construct a CAD foam part for the seat design based on the accessed CAD seat surface and the accessed seat parameters, wherein the CAD foam part represents an internal foam component of the seat design that is to be covered by a surface material represented through the CAD seat surface,
  wherein the seat parameters comprise an overbuild section indicative that a geometry of a section of the internal foam component is to extend past the seat surface of the seat design, and
  wherein the foam part generation engine is configured to construct the CAD foam part by constructing an overbuild curve of the CAD foam part to extend past the CAD seat surface at the overbuild section.

8. The system of claim 7, wherein the seat parameters comprise a seam location on the seat surface and an attachment point; and
  wherein the foam part generation engine is configured to construct the CAD foam part by inserting a trench into the CAD foam part for the seam location to reach the attachment point.

9. The system of claim 7, wherein the seat parameters comprise underbuild offsets at multiple points on the seat surface; and
  wherein the foam part generation engine is configured to construct the CAD foam part to offset the seat surface at the multiple points by the underbuild offsets.

10. The system of claim 9, wherein the foam part generation engine is configured to construct the CAD foam part further by:
  generating underbuild curves of the CAD foam part from the underbuild offsets; and
  trimming the underbuild curves at a curve intersection to form a trimmed corner of the CAD foam part.

11. The system of claim 7, wherein the foam part generation engine is configured to construct the CAD foam part further by blending a portion of the overbuild curve with a portion of an adjacent underbuild curve of the CAD foam part to form a blended surface curve.

12. The system of claim 11, wherein the foam part generation engine is configured to blend the overbuild curve with the adjacent underbuild curve by interpolating a portion of the blended surface curve to reduce or eliminate a geometric discontinuity.

13. A non-transitory machine-readable medium comprising instructions that, when executed by a processor, cause a computing system to:
  access a computer-aided design (CAD) seat surface that represents a seat surface of a seat design; and
  access seat parameters for the seat design; and
  automatically construct a CAD foam part for the seat design based on the accessed CAD seat surface and the accessed seat parameters, wherein the CAD foam part represents an internal foam component of the seat design that is to be covered by a surface material represented through the CAD seat surface,
  wherein the seat parameters comprise an overbuild section indicative that a geometry of a section of the internal foam component is to extend past the seat surface of the seat design, and
  wherein constructing the CAD foam part comprises constructing an overbuild curve of the CAD foam part to extend past the CAD seat surface at the overbuild section.

14. The non-transitory machine-readable medium of claim 13, wherein the seat parameters comprise a seam location on the seat surface and an attachment point; and
  wherein the instructions, when executed, cause the computing system to construct the CAD foam part by inserting a trench into the CAD foam part for the seam location to reach the attachment point.

15. The non-transitory machine-readable medium of claim 13, wherein the seat parameters comprise underbuild offsets at multiple points on the seat surface; and
  wherein the instructions, when executed, cause the computing system to construct the CAD foam part to offset the seat surface at the multiple points by the underbuild offsets and further by:
    generating underbuild curves of the CAD foam part from the underbuild offsets; and
    trimming the underbuild curves at a curve intersection to form a trimmed corner of the CAD foam part.

16. The non-transitory machine-readable medium of claim 13, wherein the instructions, when executed, cause the computing system to construct the CAD foam part further by blending a portion of the overbuild curve with a portion of an adjacent underbuild curve of the CAD foam part to form a blended surface curve.

17. The non-transitory machine-readable medium of claim 16, wherein the instructions, when executed, cause the computing system to blend the overbuild curve with the adjacent underbuild curve by interpolating a portion of the blended surface curve to reduce or eliminate a geometric discontinuity.

* * * * *